United States Patent [19]

Hoshino

[11] Patent Number: 4,497,092

[45] Date of Patent: Feb. 5, 1985

[54] DEVICE FOR FIXING RODS IN SELECTED RELATIVE POSITION

[75] Inventor: Yoshihiro Hoshino, Hagoya, Japan

[73] Assignee: Hoshino Gakki Company, Ltd., Japan

[21] Appl. No.: 446,067

[22] Filed: Dec. 2, 1982

[30] Foreign Application Priority Data

Jul. 12, 1982 [JP] Japan ............................ 57-105269[U]

[51] Int. Cl.³ .......................... F16B 7/10; F16L 37/00
[52] U.S. Cl. ........................................ 24/514; 24/515;
24/516; 24/271; 285/309; 403/104
[58] Field of Search ................ 24/514, 515, 516, 329,
24/330, 331, 332, 346, 498; 188/67; 403/104,
366, 373; 248/113, 74 R, 413; 285/309, 310, 312

[56] References Cited

U.S. PATENT DOCUMENTS

| | | | |
|---|---|---|---|
| 1,049,642 | 1/1913 | Baesel | 24/516 |
| 1,657,342 | 1/1928 | Ayres et al. | 24/346 |
| 2,155,705 | 4/1939 | Gottwald | 24/271 |
| 2,327,990 | 8/1943 | Benson | 403/366 |
| 2,710,207 | 6/1955 | Mueller | 403/373 |
| 3,336,642 | 8/1967 | Armacost | 24/516 |
| 3,843,083 | 10/1974 | Angibaud | 248/74 R |
| 3,963,855 | 6/1976 | Hawkins et al. | 24/329 |
| 4,111,575 | 9/1978 | Hoshino | 403/104 |
| 4,140,415 | 2/1979 | Koyamato | 403/366 |

OTHER PUBLICATIONS

Standard and Commercial Fixture Components, Ch. 17, p. 206, no date given, one sheet.

Primary Examiner—Victor N. Sakran
Attorney, Agent, or Firm—Ostrolenk, Faber, Gerb & Soffen

[57] ABSTRACT

The disclosure concerns a device for clamping two axially telescoping rods in a selected telescoped position, wherein the device includes a case supported at the end of the outside one of the two rods and the case encloses an annular bush wrapped around the inside one of the two rods. One side of the bush is open for defining an axial gap. Terminal flanges extend away from the bush at opposite sides of the gap. A shaft extends from the second of the terminal portions, through the first of the terminal portions and then outside the case. A two-position cam is journaled to the shaft and is shaped to engage the exterior of the case. As the cam is moved between its two positions, it selectively draws the terminal portion flanges together or permits them to move apart for selectively clamping or releasing the bush on the rod. A spring normally biases the terminal portion flanges apart. A nut screw-threadedly received on the shaft is adjustable along the shaft for defining the initial position of the second terminal portion with respect to the first terminal portion.

3 Claims, 3 Drawing Figures

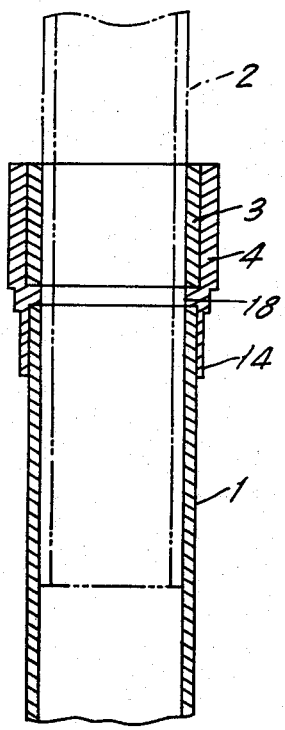

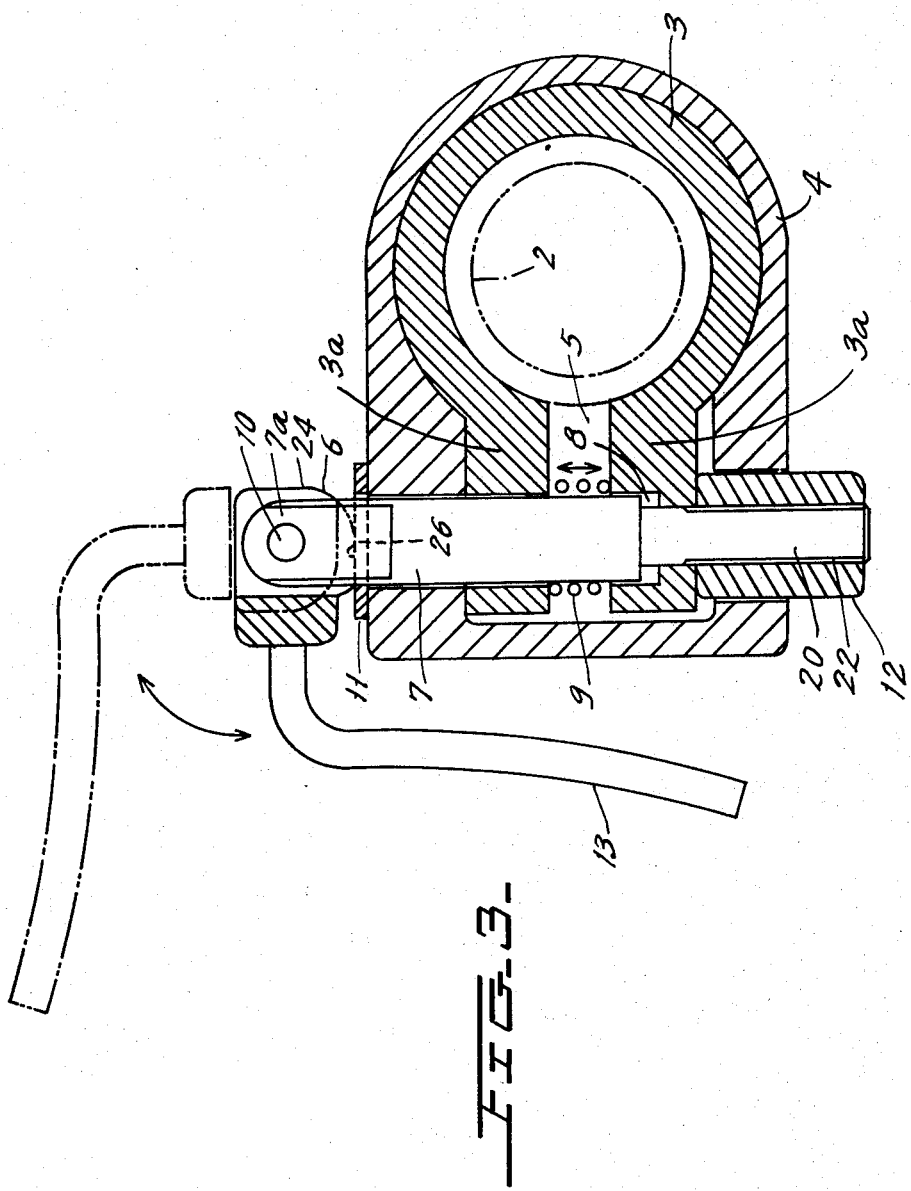

DEVICE FOR FIXING RODS IN SELECTED RELATIVE POSITION

BACKGROUND OF THE INVENTION

The present invention relates to a device for fixing rods arranged axially with respect to each other in a selected position. The invention has particular utility for adjusting the height of a drum on a drum stand or cymbal stand, and particularly for adjusting the height of the rod on which a drum is carried with respect to another rod projecting up from the drum stand or cymbal stand.

Drum stands and cymbal stands use a plurality of rods which are connected to each other so that they can slide axially or telescope with respect to each other, whereby the length of the resulting rod is freely adjustable. For securing telescoping rods at various degrees of extension, springs, screws, and various nut and bolt combinations have been employed. See, for example, U.S. Pat. No. 4,111,575. Where multiple rods are involved, it has been necessary to tighten or loosen the respective bolts and nuts at each rod joint. This has prevented quick and simple adjustment of the length of the telescoping rods and has undesirably increased the time required for setting the proper height of the drums of a drum set.

SUMMARY OF THE INVENTION

It is the primary object of the present invention to permit easy, rapid adjustment of the axial length of an array of at least two rods, particularly for adjusting the length of a telescoping rod.

It is another object of the invention to permit such length adjustment by a simple clamp release, followed by length adjustment, followed by reclamping.

The device according to the invention is adapted for use in conjunction with two telescoping rods, wherein one of the rods, and usually the upper rod, telescopes into the other rod. A supporting part is fastened on the end of the outside rod where the other, inside rod telescopes into the outside rod. The supporting part supports a case which extends over the adjacent part of the inside rod. Inside the case is an annular bushing which surrounds the inside rod. The annular bushing has a gap defined at one circumferential side of it. Supported on the bushing at both sides of the gap are respective first and second terminal portions of the bushing. When the terminal portions are drawn together, the bushing squeezes around and clamps to the inside rod, securely holding the bushing to the rod. When the terminal portions are permitted to separate, the bushing releases its grip upon the inside rod, permitting adjustment of the axial length of the rods. To draw the terminal portions of the bushing together, a shaft is secured to one of the terminal portions, passes by the other terminal portion and outside the case. A clamping device, particularly including a cam, is attached to the shaft. When the clamping device cam is in the clamping position, the cam draws the shaft out of the case, which draws the terminal portions together. When the cam is in its other released position, it permits the terminal portions of the bushing to move apart, wherein the terminal portion attached to the shaft moves away from the other terminal portion, so that the bushing releases its grip on the inside shaft. A spring normally biases the terminal portions apart. The start position of the terminal portions is adjusted by adjustment of a nut on the shaft which is movable along the shaft to determine the position along the shaft of the second terminal portion which is engaged by the shaft through the nut thereon.

Other objects and features of the present invention will become apparent from the following description of a preferred embodiment of the invention, taken in conjunction with the accompanying drawings.

BRIEF DESCRIPTION OF THE DRAWINGS

FIG. 2 is a longitudinal cross-sectional view thereof; and

FIG. 3 is a transverse cross-sectional view thereof.

DESCRIPTION OF A PREFERRED EMBODIMENT

Figure 1:
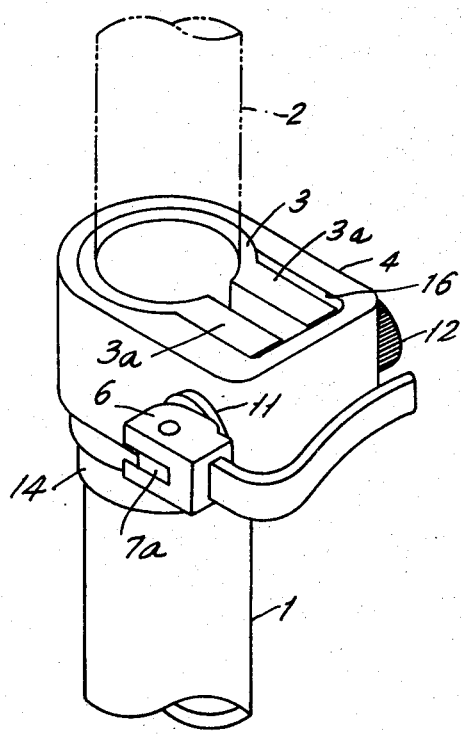
FIG. 1 is a perspective view of a telescoping rod length adjusting device of the invention.

The rod length adjusting device according to the present invention is used for adjusting the overall length of a rod comprised of a lower, tubular outside rod 1 and an upper inside rod 2 above the outside rod 1 which telescopes into the interior of the tubular inside rod 1. At the top of the rod 2, a drum (not shown), or the like object, may be supported. The extent to which the rod 2 telescopes into the rod 1 determines the total length of the rod 1, 2 and the height of an object supported on it. The device according to the invention is located at the upper end of the outside rod 1 and is provided for clamping onto the exterior of the inside rod 2, for adjusting the extent to which the inside rod 2 telescopes into the outside rod 1.

Securement of the rod 2 at its desired extension with respect to the rod 1 is obtained by use of a thick resilient material, e.g. nylon, annular bushing 3, which extends annularly around the inside rod 2. The bushing 3 has a gap 5 through it defined along the entire height of the bushing. The gap 5 provides space of a circumferential length such that the ends of the bushing at opposite sides of the gap may be drawn together. This squeezes the interior of the bushing 3 against the shaft 2 for securing the bushing to the shaft. At each side of the gap 5, the bushing 3 has outwardly projecting terminal portions 3a integrally connected to it and extending generally parallel to each other. These terminal portions are long enough to provide parts which can be acted upon for narrowing the gap or for permitting the gap to enlarge, and are also long enough that they improve the mechanical advantage of any device used to move the terminal portions together for clamping the bushing on the rod 2.

The bushing 3 is positioned around the inside rod 2 at and just above the top of the outside rod 1 by the supporting part or case 4. The case 4 has an interior opening 16 generally corresponding to the exterior profile of the bushing 3 when the terminal portions are relaxed for releasing the rod 2. The bottom of the case 4 defines a supporting shelf for the bushing 3 to prevent the bushing from falling down. For its own strength and for containing the bushing 3, the case 4 surrounds the annular exterior of the bushing and its terminal portions.

For positioning the case 4 on the lower, outside rod 1, the case 4 has an integral exterior sleeve 14, which projects down over the exterior of the top portion of the outside rod 1, as can be seen in FIG. 2. Above the upper end of the rod 1, the case 4 projects inwardly at 18 sufficiently for the case to rest on the top end of the rod 1, which positions the case along the rod 1.

The bushing 3 is held in the case 4 and, more important, the terminal portions 3a of the bushing are selectively drawn together for tightening the bushing around the shaft 2 or are permitted to move apart, through operation of the cam controlled tightening shaft 7, which is controlled by the below-described cam 6. The shaft 7 is received in a running opening 8 which extends transversely across and through both terminal portions 3a. The shaft 7 has a narrowed portion which projects out of one end of the cae 4, at the bottom of FIG. 3, and also projects out of the other end of the case 4, at the top of FIG. 3.

The narrowed end portion 20 of the shaft 7 is screw-threaded on its exterior at 22 for threadedly receiving a cooperating adjusting nut 12 which is tightened up over the threaded portion 22 of the shaft and against the outside of the one terminal portion 3a. The nut 12 defines an abutment against the terminal portion for enabling that terminal portion to be forced toward the other terminal portion by the cam 6.

At the other end 7a of the shaft 7 is located the cam 6, which is a bifurcated cam element that is journaled to the shaft 7 at the rotation axis 10. The cam 6 has two cam faces 24 and 26 which are different respective distances from the axis 10. There is on the exterior side of the case 4, facing in opposition to the cam 6, a metallic, wear-resistant cam seat 11. As the cam 6 is rotated between its two positions, it selectively moves its cam faces 24 and 26 against the seat 11. With the face 26 against the seat 11, since the face 26 is a greater distance from the axis 10 than the face 24, the shaft 7 is drawn up in FIG. 3, out of the case 4. This, in turn, pulls the nut 12 against the lower terminal portion 3a in FIG. 3, moving it toward the upper terminal portion 3a. The upper terminal portion 3a is blocked from moving along with the lower terminal portion 3a by its engagement with the inside wall of the case 4, whereby as the cam face 26 is moved into engagement with the seat 11, the terminal portions are effectively drawn together, somewhat closing the gap 5 in the bushing 3 and clamping the bushing on the rod. Conversely, when the cam 6 is rotated to its other orientation with the face 24 against the seat 11, the distance between the axis 10 and the face 24 is less than the distance between the axis 10 and the face 26, the shaft 7 is freed to move back down into the case 4. A coiled, compression spring 9 is disposed around the shaft 7 between the terminal portions 3a and it normally biases the terminal portions 3a apart. When the cam face 24 is in engagement with the seat 11, this permits the terminal portions 3a to be biased apart. The securement of the bushing 3 on the rod 2 is released enough to permit the rod 2 to shift with respect to the bushing and therefore with respect to the outside rod 1 for readjusting the effective length of the rod 1, 2.

An operating lever 13 is attached to the cam 6 for moving it between its two positions. The length of the lever gives the operator significant mechanical advantage in moving the cam between its two positions and it also serves as an indicator of the orientation of the cam, whith the cam being in the position for locking the bushing against the outside rod 2 with the lever 13 in the solid line position in FIG. 3 and with the bushing releasing the inside rod 2 to shift with respect to the outside rod 1 with the lever 13 in the broken line position.

The nut 12, which serves as the abutment for moving the terminal portion 3a along with the shaft 7 toward the other terminal portion 3a, is adjustable in position along the shaft 7, 20 for adjusting the effective length of the shaft with respect to the terminal portions 3a for accommodating manufacturing tolerances, wear of the various parts, including the cam, through use, and for also adjusting the ultimate tightening force exerted by the cam 6 upon the bushing 3 for tightening the bushing 3 on the rod 2.

With the present invention, simple, rapidly accomplished operation of the cam operating lever 13 selectively tightens the rods 1, 2 in a fixed location with respect to each other or releases them to shift with respect to each other, so that with one touch operation, quick setting of the length of the rod 1, 2 and thereby adjustment of the height of a drum (not shown) supported thereon can be accomplished.

Although the present invention has been described in connection with a preferred embodiment thereof, many variations and modifications will now become apparent to those skilled in the art. It is preferred, therefore, that the present invention be limited not by the specific disclosure herein, but only by the appended claims.

What is claimed is:

1. Clamping means for securing coaxial, axially telescoping rods together, the clamping means comprising:

a first part for attachment to the end of one of the rods adjacent the other rod;

an annular bushing supported to the first part and extending around the other rod; the bushing being open along one circumferential side for defining an axial gap through the bushing; the bushing including first and second terminal portions on opposite sides of the gap in the bushing, such that drawing the terminal portions together reduces the gap and tightens the bushing around the other rod, and permitting the terminal portions to move apart loosens the bushing from around the other rod;

a shaft extending from the second terminal portion past the first terminal portion;

a clamp connected with the shaft for drawing the second terminal portion toward the first terminal portion; the first part blocking the first terminal portion from moving away from the second terminal portion as the second terminal portion is drawn toward the first terminal portion, whereby operation of the clamp draws the terminal portions together to clamp the bushing on the other rod;

said clamp comprising a cam connected with the shaft; the cam being movable between a clamping position at which the clamp draws the shaft to move the second terminal portion toward the first terminal portion and a releasing position at which the cam permits the shaft to shift to move the second terminal portion away from the first terminal portion to release the bushing from securing the other rod;

said first part comprising a case extending around the bushing; the shaft extending from the second terminal portion past the first terminal portion and out of the case past the first terminal portion; the cam being located outside the case beyond the first terminal portion; the cam engaging the case beyond the first terminal portion upon movement of the cam between the clamping and released positions thereof; the cam being shaped for moving the shaft for moving the second terminal portion with respect to the first terminal portion as the cam moves between the clamped and released positions;

the case being shaped for being engaged by the first terminal portion as the shaft draws the second terminal portion toward the first terminal portion; and said cam being journaled to the shaft at a pivot axis across the shaft; the cam including a first cam surface which is at a relatively greater distance from the pivot axis and a second cam surface which is at a relatively lesser distance from the pivot axis; wherein with the first cam surface engaging the case, the shaft being drawn to move the second terminal portion toward the first terminal portion, and with the second cam surface engaging the case, the shaft being permitted to shift to permit the first and second terminal portions to separate.

2. The clamping means of claim 1, further comprising biasing means for urging the first and second terminal portions apart.

3. The clamping means of claim 2, wherein the shaft is connected with the second terminal portion through an abutment positioned on the shaft, and the abutment being movable along the shaft to different positions on the shaft for determining the initial extent of separation of the first and second terminal portions with the cam in the released position.

* * * * *